United States Patent [19]

Nishimura

[11] Patent Number: 5,222,194
[45] Date of Patent: Jun. 22, 1993

[54] NEURAL NETWORK WITH MODIFICATION OF NEURON WEIGHTS AND REACTION COEFFICIENT

[75] Inventor: Kazuo Nishimura, Kanagawa, Japan

[73] Assignee: Kabushiki Kaisha Toshiba, Kawasaki, Japan

[21] Appl. No.: 661,194

[22] Filed: Feb. 27, 1991

[30] Foreign Application Priority Data

Feb. 27, 1990 [JP] Japan .................................. 2-48674

[51] Int. Cl.$^5$ .............................................. G06F 15/18
[52] U.S. Cl. .................................... 395/23; 395/27
[58] Field of Search ............................ 395/23, 24, 27

[56] References Cited

U.S. PATENT DOCUMENTS

| | | | |
|---|---|---|---|
| 4,912,652 | 3/1990 | Wood | 395/23 |
| 5,046,020 | 9/1991 | Filkin | 395/23 |
| 5,050,095 | 9/1991 | Samad | 395/23 |
| 5,073,867 | 12/1991 | Murphy et al. | 395/27 |
| 5,093,899 | 3/1992 | Hiraiwa | 395/23 |
| 5,129,038 | 7/1992 | Kohda et al. | 395/23 |
| 5,131,073 | 7/1992 | Furuta et al. | 395/27 |

OTHER PUBLICATIONS

A CMOS Neural Network for Pattern Recognition; IEEE MICRO; Walker et al; Oct. 1989; pp. 68–74.

VLSI Architectures for Neural Networks; IEEE MICRO; Treleaven et al; Dec. 1989; pp. 8–27.

*Primary Examiner*—Allen R. MacDonald
*Attorney, Agent, or Firm*—Oblon, Spivak, McClelland, Maier & Neustadt

[57] ABSTRACT

A neural network computation apparatus having a plurality of layers, each of the plurality of layers has at least an input layer and an output layer, each layer having a plurality of units, a plurality of links, each of the plurality of links connecting units on the plurality of layers, and changing means for changing input and output characteristics of a particular unit of the plurality of units and/or the weight of a particular link of the plurality of links in accordance with an output of the output layer after learning an example and with a particular rule. After the neural network computation apparatus learns an example, the changing means changes input and output characteristics of units and weights of links in accordance with outputs of the output layer and a particular rule. Thus, a mutual operation between a logical knowledge and a pattern recognizing performance can be accomplished and thereby a determination close to that of a specialist can be accomplished. In other words, a proper determination in accordance with an experience can be made so as to deal with unknown patterns with high flexibility.

4 Claims, 11 Drawing Sheets

NO UOTPUT $c^{(n)} = 0.1$

FIG. 6a

INCREASE THE SELECTIVE
REACTION COEFFICIENT $c^{(n)} = 0.2$

FIG. 6b

UNBALANCE THE RELATIVE
CONTRIBUTION COEFFICIENT $c^{(n)} = 0.2$, $f_1 \sim f_4 = 0.8$, $f_5 = 1.8$

VOLTAGE STATE EVALUATION SYSTEM

| PATTERN / ITEM | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 DAYTIME | O | O | O | O | O | O | O | O | O | O | O | O | O | O |
| 2 NIGHT | O | O | | | | | | | | | | | | |
| 3 HEALTHY | | | | | | | | | | | | | | |
| 4 SLIGHTLY LOW | | | | | | | | | | | | | | |
| 5 LOW | | | O | | O | O | O | O | | | | | | |
| 6 ABNORMALLY LOW | | | | O | | | | | | | | | | |
| 7 NORTHEAST | | | | | | | | | O | O | O | O | O | O |
| 8 NORTHWEST | | | | | | | O | O | | | O | O | | |
| 9 SOUTHEAST | | | | | | O | | | | | | | | |
| 10 SOUTHWEST | | | | | O | | | | O | | | | O | O |
| 11 HEAVY LOAD | | | | | | | | | | | | | O | O |
| 12 OVERALL | O | O | O | O | | | | | | | | | | |

EXAMPLE OF TYPICAL VOLTAGE PATTERN
(PATTERN 4)

*FIG. 10* PRIOR ART

EXAMPLE OF EVALUATION RESULT

NEURAL NETWORK WITH MODIFICATION OF NEURON WEIGHTS AND REACTION COEFFICIENT

BACKGROUND OF THE INVENTION

1. Field of the Invention

The present invention relates to a neural network computation apparatus which is a parallel computation apparatus modeled on the neural network of a human being.

2. Description of the Related Art

Recently, a highly distributed computation apparatus called a neural network computation apparatus (also called neural-net or neural network) has gained the public attention.

The neural network computation apparatus is modeled on the neural network of a human being. It has the advantages of high speed and noise resistance due to its structure of parallel computation. However, the most attractive feature of the neural network computation apparatus is a learning capability.

The learning capability is a capability for accomplishing desired input and/or output characteristics only by teaching examples by using input and/or output signals to the apparatus. Applications using such characteristics have been widely attempted in many fields such as image processing, character recognition, control systems, and expert systems.

As one application of such a neural network computation apparatus, a voltage state evaluation system for a power system has been known.

Figure 7:
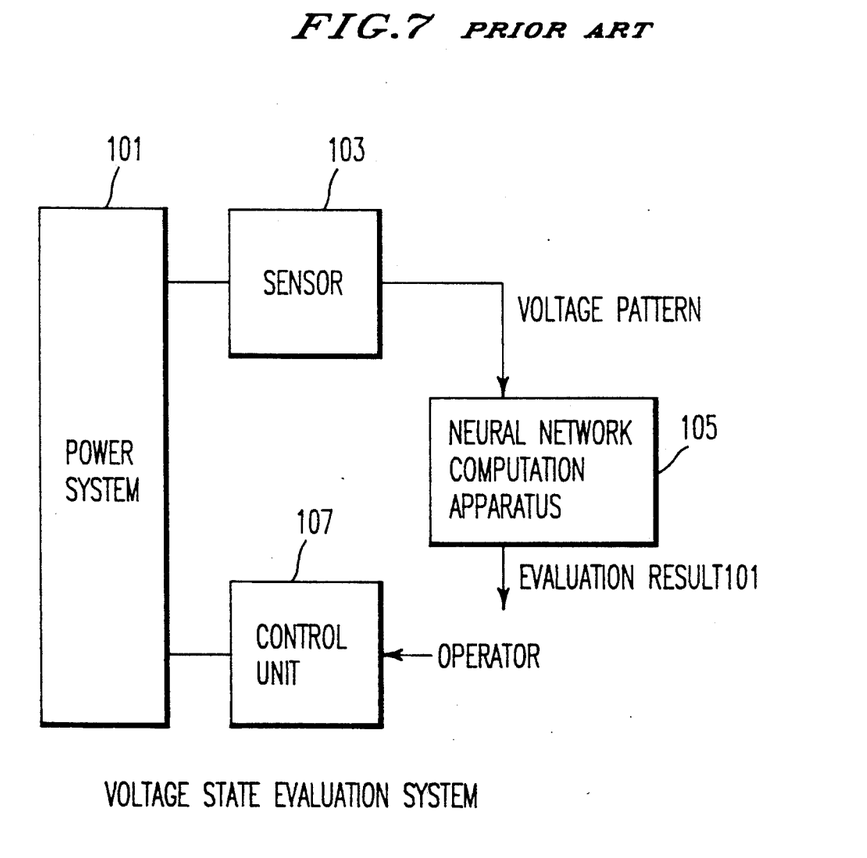
FIG. 7 is a block diagram of a voltage state evaluation system.

FIG. 7 is a block diagram showing the structure of such a voltage state evaluation system. This system evaluates whether or not the power system is in a dangerous state with respect to stability by using a pattern of a state variable group representing the state of the power system. As the state amounts of the system, it is possible to consider voltage, passed power, phase difference angle, and so forth. However, such a system in this example only deals with the voltage.

In FIG. 7, reference numeral 101 is a power system composed of power stations and so forth. A sensor 103 detects the voltages of power stations in the power system 101 and sends the voltage pattern to a neural network computation apparatus 105.

The neural network computation apparatus 105 outputs an evaluation result in accordance with the voltage pattern sent from the sensor 103. The operator of the power system commands a control unit 107 in accordance with the evaluation result and thereby the control unit 107 controls the control system 101.

Figure 8:
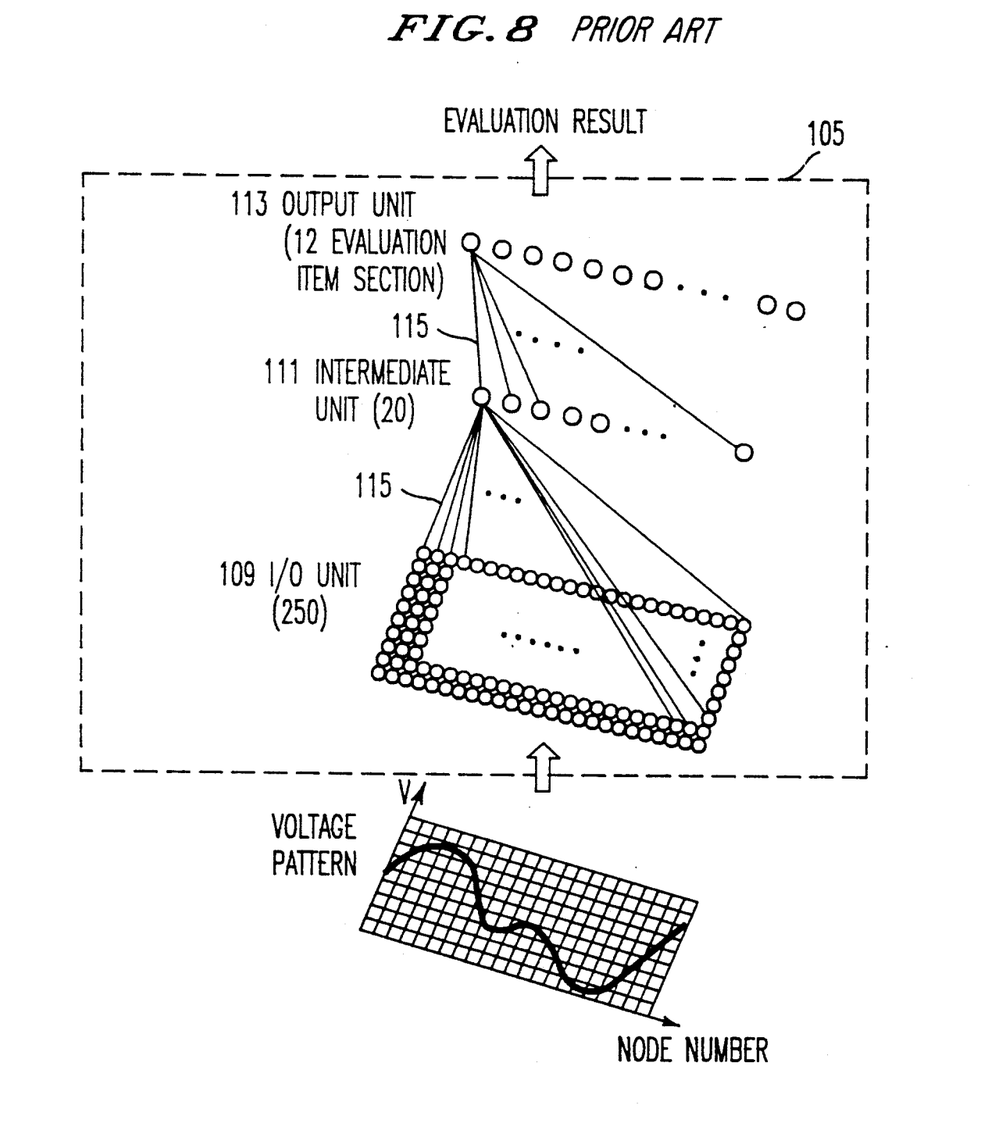
FIG. 8 is a diagram showing the structure of a neural network computation apparatus 105.

FIG. 8 is a schematic showing the structure of the neural network computation apparatus 105 in detail. As shown in the figure, the neural network computation apparatus 105 comprises 250 input units 109, 20 intermediate units 111, 12 output units 113, and 12 links 115.

The sensor 103 inputs the voltage pattern to the input unit 109. The voltage pattern is made by discreting voltages with a width of 0.01 [pu] and by meshing them with node numbers and voltage range. Although the total number of nodes is 35, since 10 nodes of power generators are excluded, 10 nodes are considered. On the other hand, since the voltage range is divided into 10 levels, 250 meshes (i.e. 25×10=250) are created. One neuron of the input unit 109 is assigned to each mesh.

Figure 9:
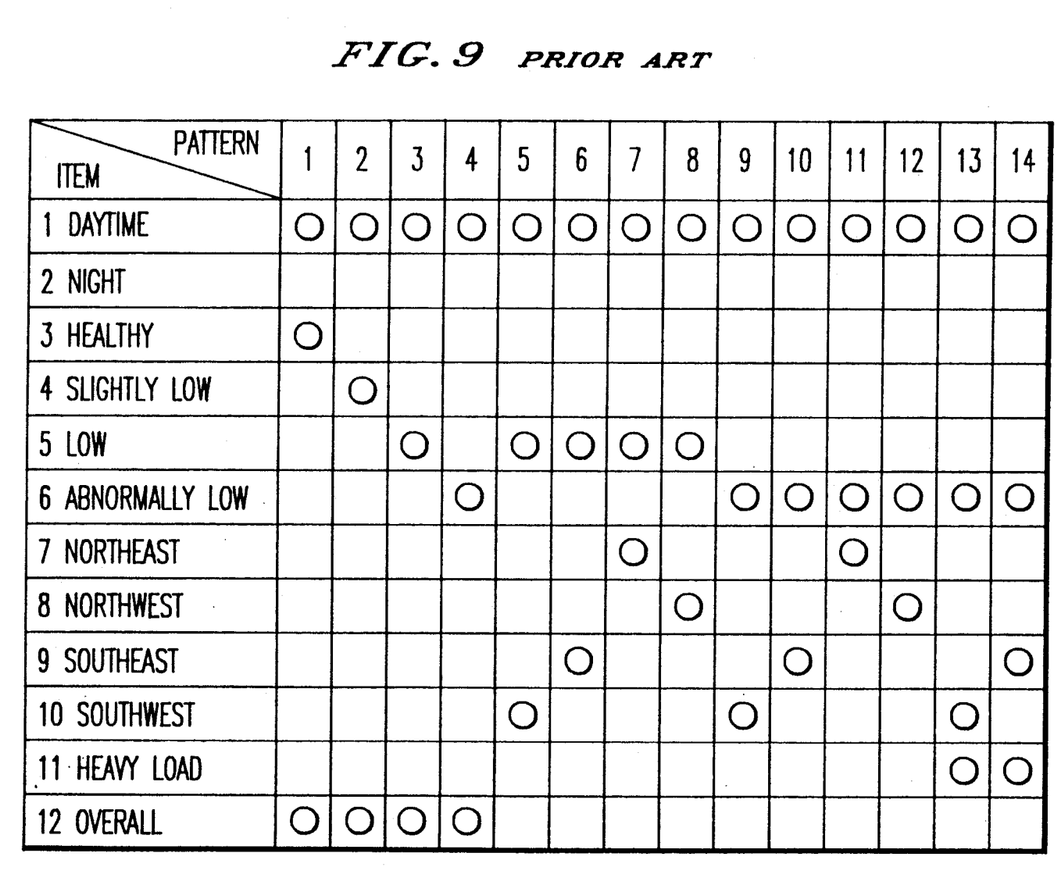
FIG. 9 is a diagram showing an example of evaluation items.

There are 12 output units 113 which output 12 evaluation items as shown in FIG. 9.

The learning operation of the aforementioned neural network computation apparatus is executed in the following manner.

14 teaching patterns shown by the horizontal columns of FIG. 9 are made, where each evaluation item is set to 1.0 if its condition is satisfied; and it is set to 0.0 if the condition is not satisfied. The teaching operation is repeated in the order of the pattern 1 to pattern 14.

The neural network computation apparatus taught in the aforementioned manner outputs an evaluation result shown in FIG. 9 in accordance with voltage patterns given as examples.

Figure 10:
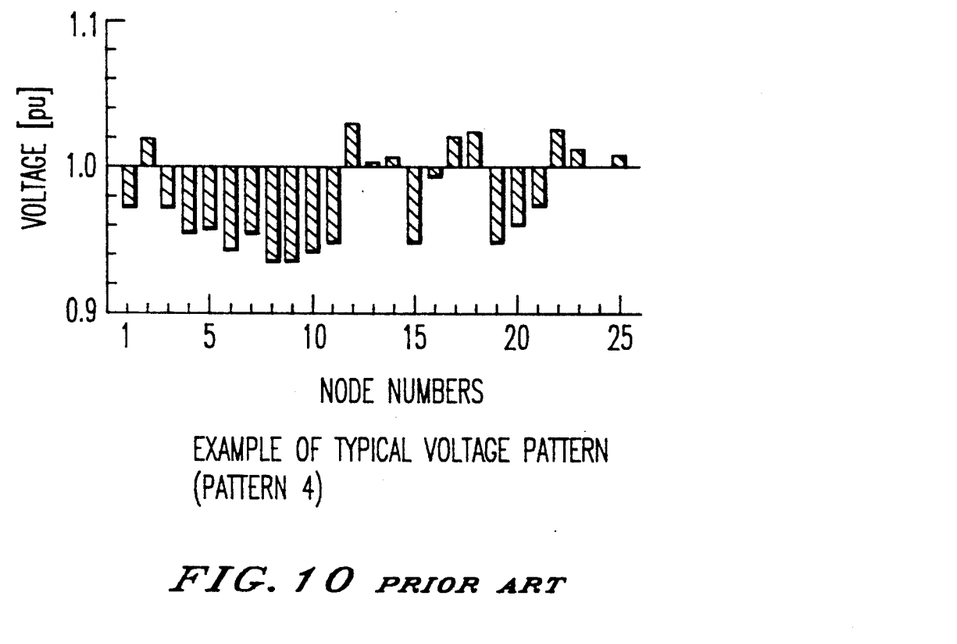
FIG. 10 is a diagram showing typical voltage patterns.
Figure 11:
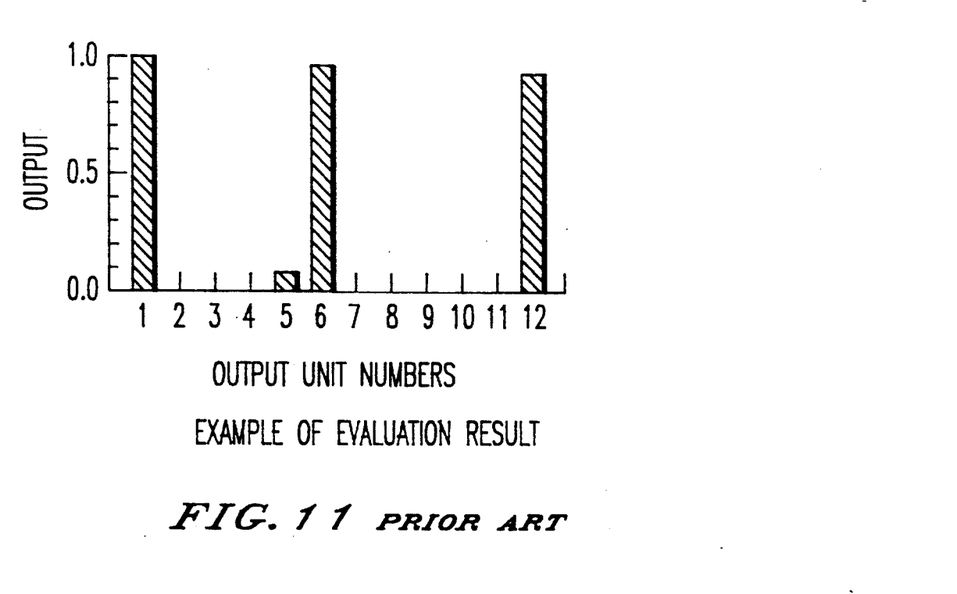
FIG. 11 is a diagram showing an example of outputs of the neural network computation apparatus 105.

FIG. 10 and FIG. 11 exemplify input and output characteristics of the neural network computation apparatus after the learning operation. As shown in FIG. 10, when the voltage patterns of all the nodes are lower than 1.0, which is the reference value, the evaluation item 1 "Day time", item 6 "Abnormally low", and item 12 "Overall" are satisfied and thereby an evaluation result in accordance with the pattern 4 as shown in FIG. 11 is output.

However, in the conventional neural network computation apparatus, after the learning operation is completed in a learning algorithm, the strength of the links is fixed and the determination is made in accordance with only the pattern of input data. Thus, since the neural network computation apparatus only outputs fixed and simple output patterns, it cannot make logical determinations.

In other words, the neural network computation apparatus cannot determine unknown patterns as opposed to specialists who determine matters through their experiences. Thus, the neural network computation apparatus may output improper results.

An example of an improper determination made by the aforementioned voltage state evaluation system against an unknown pattern will be described in the following.

In this example, we consider the capability of interpolation of the neural-net where the pattern 8 "Northwest region voltage drop" shown in FIG. 9 is changed and deviated and thereby the feature of the pattern 8 gradually becomes weak.

Figure 12:
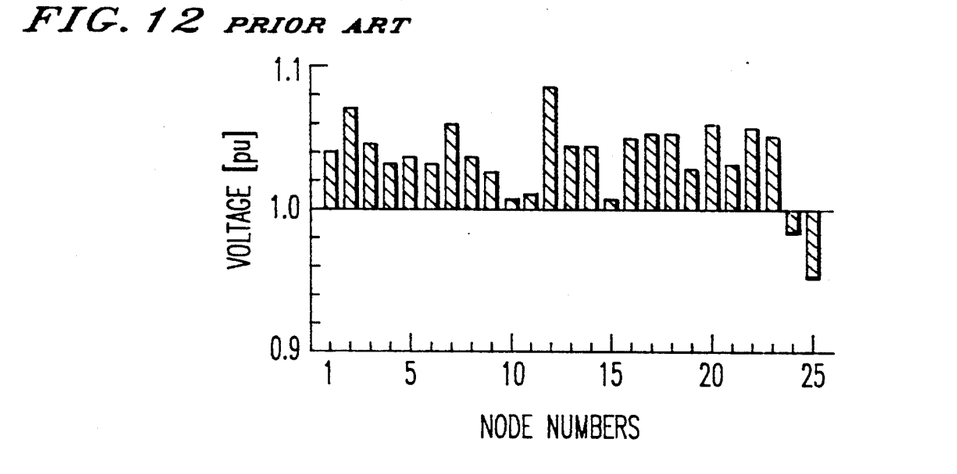
FIG. 12 is a diagram showing voltage patterns being input to the neural network computation apparatus.
Figure 13:
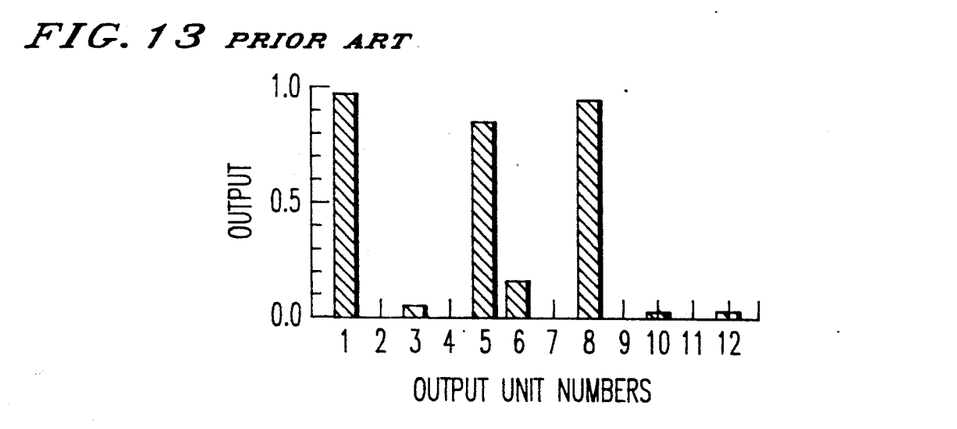
FIG. 13 is a diagram showing an evaluation result when the voltage patterns shown in FIG. 12 are input.
Figure 14:
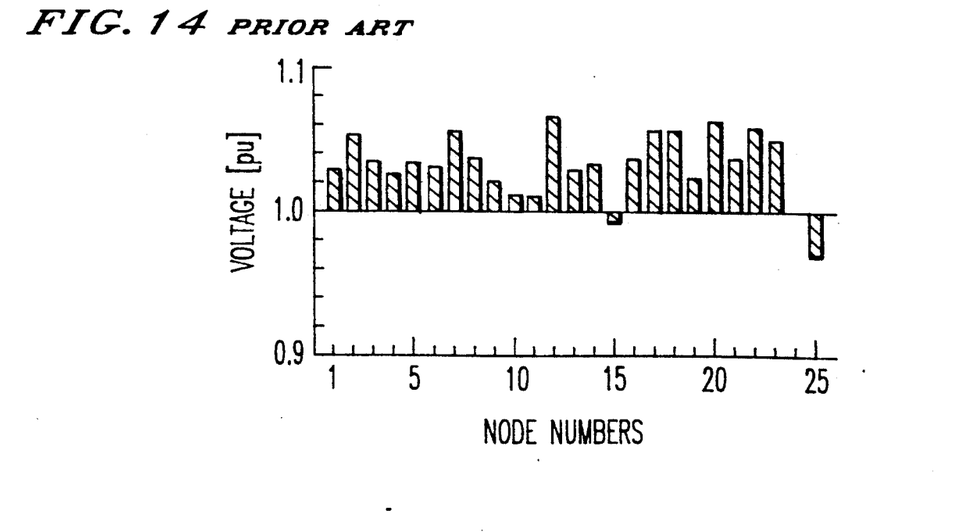
FIG. 14 is a diagram showing voltage patterns being input to the neural network computation apparatus.
Figure 15:
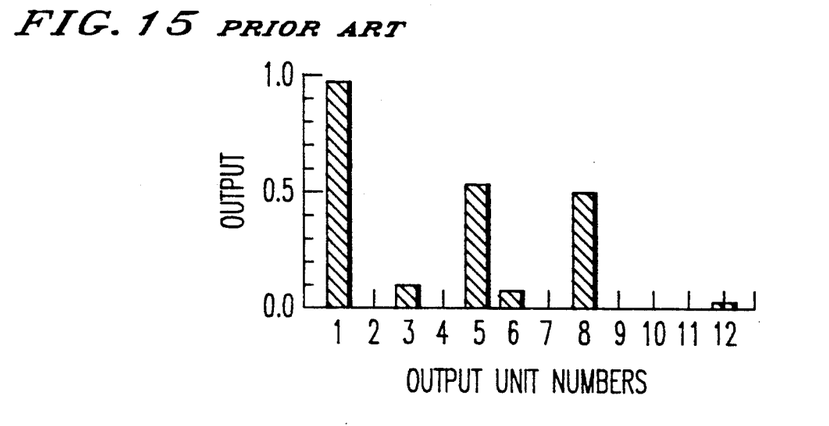
FIG. 15 is a diagram showing an evaluation result when the voltage patterns shown in FIG. 14 are input.
Figure 16:
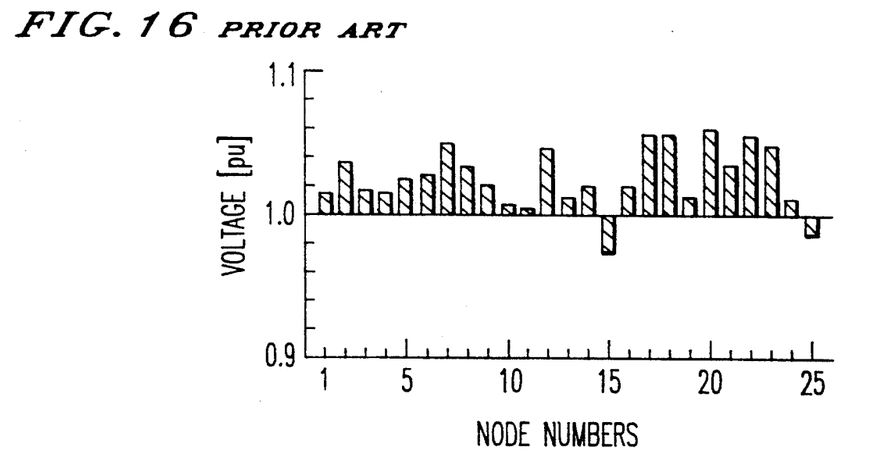
FIG. 16 is a diagram showing voltage patterns being input to the neural network computation apparatus.
Figure 17:
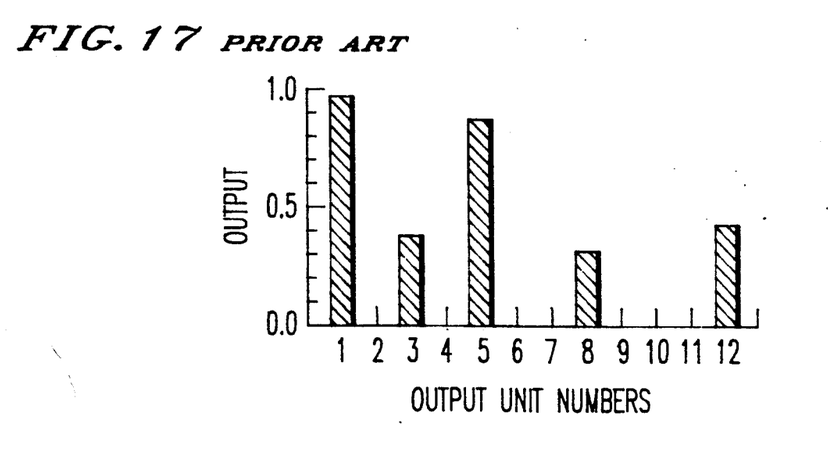
FIG. 17 is a diagram showing an evaluation result when the voltage patterns shown in FIG. 16 are input.

FIG. 12 is a diagram showing voltage patterns being input to the neural network computation apparatus. FIG. 13 is a diagram showing an evaluation result when the voltage patterns shown in FIG. 12 are input. FIG. 14 is a diagram showing voltage patterns being input to the neural network computation apparatus. FIG. 15 is a diagram showing an evaluation result when the voltage patterns shown in FIG. 14 are input. FIG. 16 is a diagram showing voltage patterns being input to the neural network computation apparatus. FIG. 17 is a diagram showing an evaluation result when the voltage patterns shown in FIG. 16 are input.

In FIG. 12, FIG. 14, and FIG. 16, the node numbers 24 and 25 accord with the northwest region. The voltage drop amount of the region gradually decreases in the order of that shown in FIG. 12, FIG. 14, and FIG. 16.

FIG. 13 precisely shows the output according to the pattern 8. On the other hand, in the case where voltage change and voltage deviation are small as shown in FIG. 14, if the characteristic of the overall shape of all the patterns is remarkably similar to that shown in FIG. 12, the outputs of the output unit numbers 1, 5, and 8 as shown in FIG. 15 become large and thereby the determination of the pattern 8 is made.

On the other hand, in the case where voltage change and voltage deviation of the node number 24 and the node number 25 are large and voltage drop takes place in other nodes, the outputs of the output unit number 3 and the output unit number 12 become large.

The output of the output unit number 3 represents "Healthy voltage". The output of the output unit number 12 represents "Overall". FIG. 17 is also similar to the pattern 1.

Although such a determination is not suitable in terms of the similarity of the voltage pattern shape, it is unsuitable in terms of the meaning.

When a determination is made by referring to FIG. 17, the change and deviation of the figure is closest to those of the pattern 1 except for the pattern 8. On the other hand, when the operator sees the diagram shown in FIG. 17, he or she cannot easily determine whether the change and deviation pattern of the figure is close to that of the pattern 1 or the pattern 8.

However, a specialist in the control operation of an electric power system will focus on the voltage drop in the northwest region which may result in a serious situation and the similarity with the pattern 8 even if it seems totally to be healthy.

The aforementioned determination comes with a logical interpolation as well as the similarity in terms of shape.

In other words, while a specialist feeds back his or her logical knowledge to a pattern recognition, the conventional neural network computation apparatus does not consider the relationship between the logical knowledge and the pattern recognition capability. Such an omission of the connection of the logical knowledge and the pattern recognition capability results in one of the major factors of restricting the performance of the neural network computation apparatus.

Thus, it is very important to logically make determinations of the neural network computation apparatus so that it properly determines unknown patterns.

Therefore, an object of the present invention is to solve the aforementioned problem and to provide a neural network computation apparatus which can make determinations similar to those made by specialists in accordance with logical knowledge.

SUMMARY OF THE INVENTION

A neural network computation apparatus according to the present invention comprises a plurality of layers, each of the plurality of layers has at least an input layer and an output layer, each layer having a plurality of units, a plurality of links, each of the plurality of links connecting units on the plurality of layers, and changing means for changing input and output characteristics of a particular unit of the plurality of units and/or the weight of a particular link of the plurality of links in accordance with an output of the output layer after learning an example and with a particular rule.

After the neural network computation apparatus learns an example, the changing means changes input and output characteristics of units and weights of links in accordance with outputs of the output layer and a particular rule.

The change of the input and output characteristics is with respect to the change of the reaction characteristics of a unit against an input thereto (namely, whether the unit strongly or lightly reacts to the input). The change of the weight of a link is with respect to the change of the strength of the link of a portion particularly concerned.

By using outputs of the computation apparatus, the changing means remarkably changing a part of the computation apparatus which has learned an example.

Thus, a mutual operation between a logical knowledge and a pattern recognizing performance can be accomplished and thereby a determination close to that of a specialist can be accomplished.

In other words, a proper determination in accordance with an experience can be made so as to deal with unknown patterns with high flexibility.

BRIEF DESCRIPTION OF DRAWINGS

FIGS. 6 (a), (b) and (c) are diagrams showing output changes of the logical unit group;

DESCRIPTION OF PREFERRED EMBODIMENTS

Now, an embodiment according to the present invention will be described.

Figure 1:
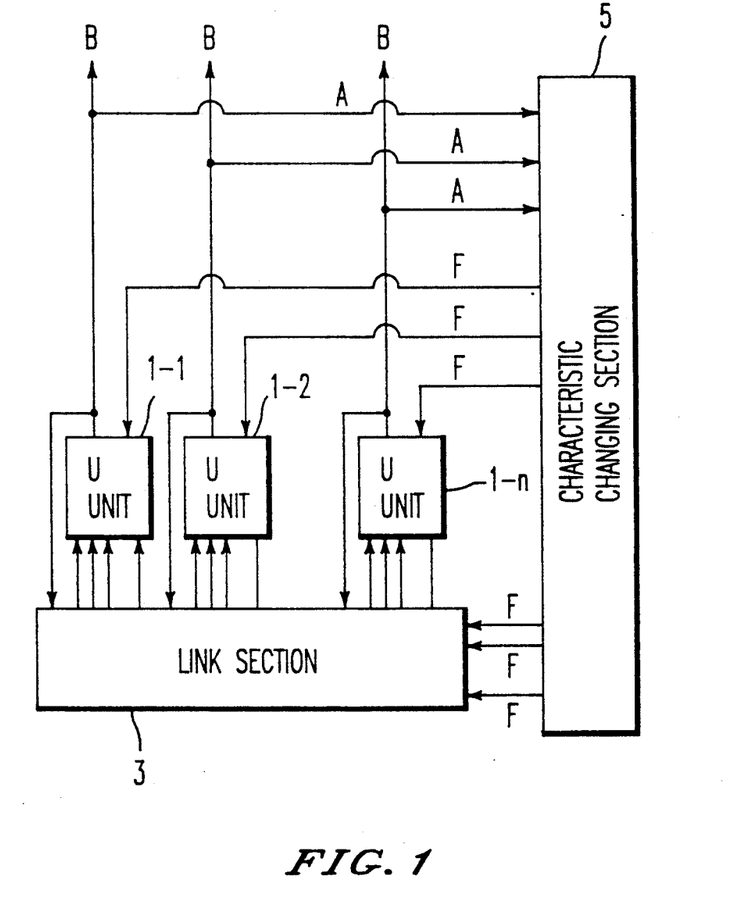
FIG. 1 is a block diagram showing the theoretical structure of the present invention.

FIG. 1 is a block diagram showing the theoretical structure of a neural network computation apparatus according to the present invention. The neural network computation apparatus comprises a plurality of units 1-1, ..., 1-n, a link section 3, and a characteristic changing section 5.

After the characteristic changing section 5 learns an example, it changes I/O characteristics and particular weights of the link section 3 for particular units 1-i, ..., etc. in accordance with outputs of the units 1-1, ..., 1-n and a particular rule.

In the neural network computation apparatus, all or part of outputs of the units 1-1, ..., and 1-n are sent to the characteristic changing section 5. The output of the neural network computation apparatus is a result against an example given as a learning operation in accordance with the I/O characteristics.

The characteristic changing section 5 outputs data in accordance with the output result of the neural network computation apparatus and feeds back it to the individual units 1-1, ..., and 1-n, and the link section 3. Since the I/O characteristics of particular units 1-i, ..., etc. and the strength of the link (weight coefficient) of the link section 3 vary in accordance with the feedback operation, the pattern recognizing characteristics vary.

In other words, after an example is has been learned, part the of characteristics of the neural network computation apparatus is varied. Thereafter, the pattern is recognized in accordance with the pattern recognizing characteristics being varied. A result with respect to a particular portion is output in accordance with the arrow mark B.

The determined result shown by the arrow mark includes a pattern recognition where a logical knowledge is fed back like a specialist does.

Figure 2:
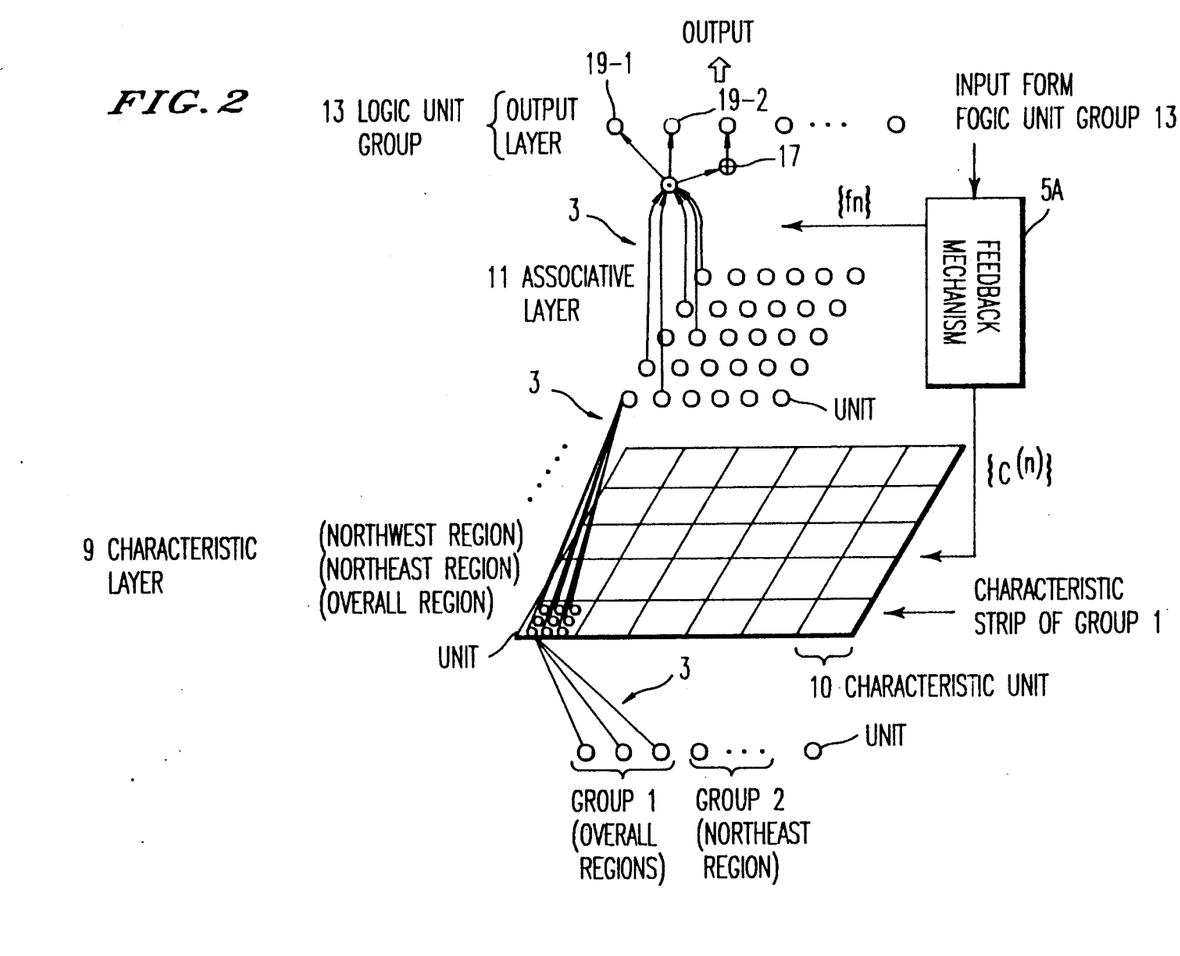
FIG. 2 is a schematic showing the practical structure of a neural network computation apparatus according to an embodiment of the present invention.
Figure 3:
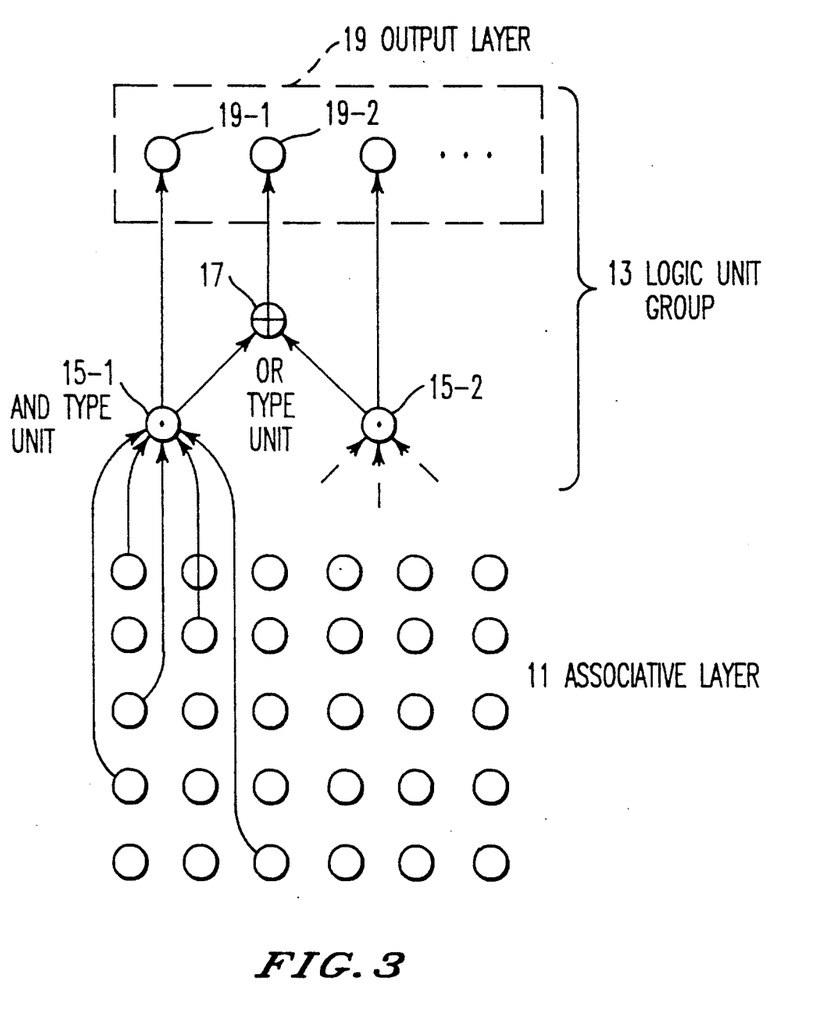
FIG. 3 is a schematic showing the structure of an associative layer and a logical unit group.

Now, the practical structure of the neural network computation apparatus in accordance with the embodiment of the present invention will be described. FIG. 2 is a schematic showing the practical structure of the neural network computation apparatus according to the present invention. FIG. 3 is a schematic showing the structure of an associative layer and a logical unit group.

As shown in FIG. 2, the neural network computation apparatus comprises an input layer 7, a characteristic layer 9, an associative layer 11, a logic unit group 13, and a feedback mechanism 5a. Each of the input layer 7, the characteristic layer 9, the associative layer 11, and the logic unit group 13 is composed of a plurality of units.

The link section 3 shown in FIG. 1 is a set of links which connect the units shown in FIG. 2. The feedback mechanism 5 is equivalent to the characteristic changing section 5 shown in FIG. 1.

In the present embodiment, after an example has been learned, the I/O characteristic of the units of the characteristic layer 9 and the weight coefficient of the link 3 connected from the associative layer 11 to the logical unit group 13 are changed.

The input layer 7 functions as input terminals for receiving input data. The input data train is divided into a group of five portions. The input layer 7 is also divided into a group of five portions.

The characteristic layer 9 is composed of a plurality of characteristic units 10 according to data train of each portion. The ignition characteristic of each unit of the characteristic layer 9 is of selective reaction rather than the sigmoid characteristic such as the ignition characteristic of a unit treated as the conventional backpropagation. The characteristic of the selective reaction is expressed by using the following equation.

$$a_k = exp(-u_k/c^{(n)}) \quad (2)$$

$$u_k = ||w^{(n)}k - V^{(n)}|/51 \; /|/51 \; w^{(n)}k|| \quad (3)$$

where $a_k$ is the output of the unit k of the characteristic layer;

$c^{(n)}$ is the coefficient of controlling the selective reaction of the unit (hereinafter named the selective reaction coefficient);

$V^{(n)}$ is the vector composed of outputs of the unit group of the input layer according to the group n (same as partial input data train); and $w^{(n)}k$ is the vector composed of the weights of the links connected from the unit group of the input layer according to the group n to the unit k of the characteristic layer.

The associative layer 11 collects the outputs of the characteristic layer 9 so as to mix the information in the groups and to convert it into a logical output. The units in the associative layer 11 just accord with the characteristic units in the characteristic layer 9. The output of the associative layer 11 is the maximum value of the unit outputs of the characteristic units 10. The output of the associative layer 11 is expressed by using the following equation.

$$A_{np} = max(a_k), \; k \approx R_{np} \quad (4)$$

where $A_{np}$ is the output of the associative layer 11 according to the p-th characteristic unit in the characteristic units 10 of the group n;

$a_k$ is the output of the unit k of the associative layer 9; and $R_{np}$ is a set of the unit numbers included in the p-th characteristic unit in the characteristic units 10 in the group n.

The logic unit group 13 is composed of an AND type unit 15, an OR type unit 17, output units 19-1, 19-2, ..., and so forth.

Figure 4:
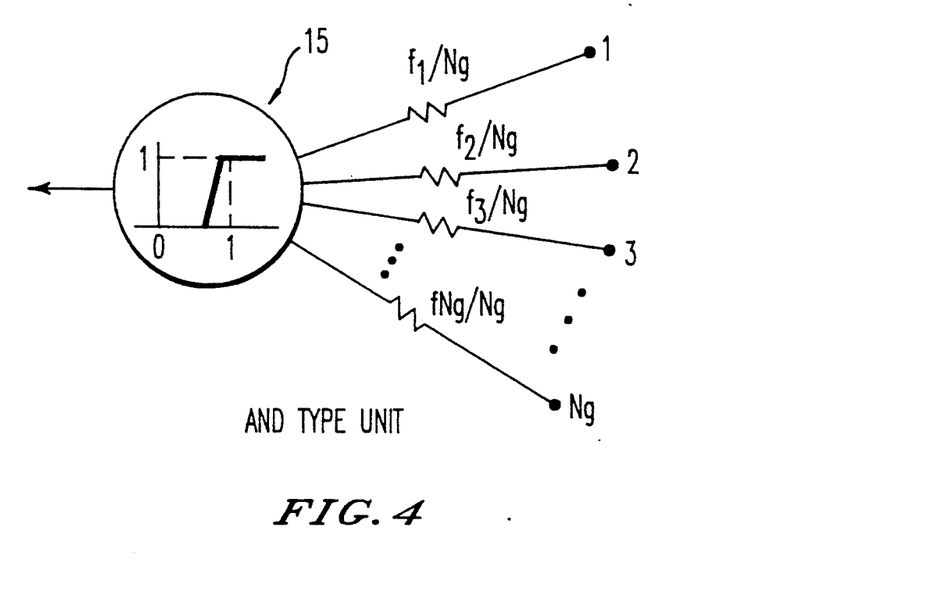
FIG. 4 is a schematic showing an AND type unit.

The AND type unit 15 shown in FIG. 4 outputs 1.0 or similar value thereto only when all the inputs are close to 1.0. The weights of the links being input to the AND type unit 15 are defined so that the following equation is satisfied.

$$\sum_{n=1}^{Ng} Wn = 1 \quad (5)$$

where

Ng is the number of groups; and

Wn is the weight of the link from the output of the associative layer 11 according to the group n. Wn is defined the following equation.

$$Wn = fn/Ng \quad (6)$$

where fn is the relative contribution coefficient of the group n in the pattern evaluation. By varying the relative contribution coefficient fn in the range given by Equation (5), the degree of the contribution of each partial data train can be controlled.

Figure 5:
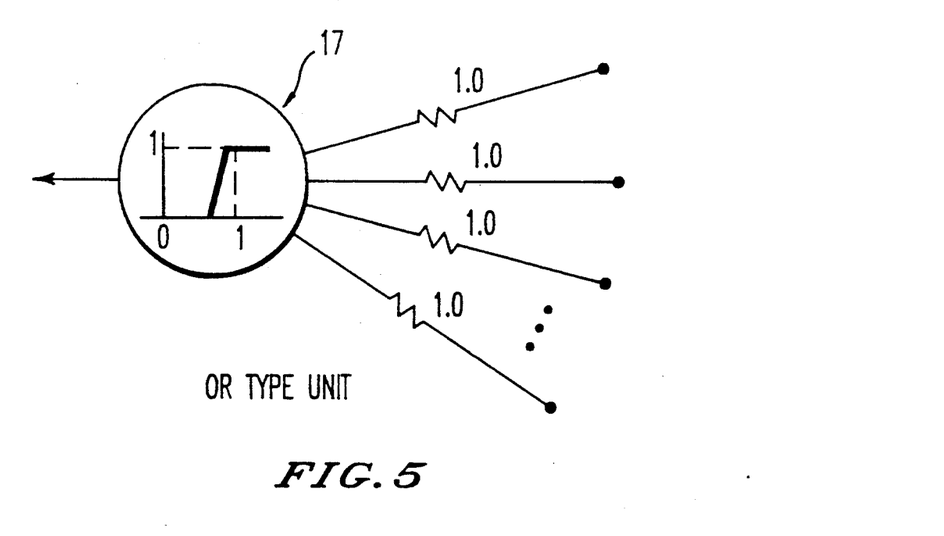
FIG. 5 is a schematic showing an OR type unit.

The OR type unit 17 shown in FIG. 5 outputs 1.0 or similar value thereto when at least one of inputs thereof is close to 1.0.

The output units 19-1, 19-2, ..., and so forth output the evaluation results shown in FIG. 11.

The feedback mechanism 5 changes the selective reaction coefficient $c^{(n)}$ of the units of the characteristic layer 9 and the relative contribution coefficient fn of the link 3 in accordance with the outputs of the logic unit group 13 and a particular rule. Thus, the neural network computation apparatus can add the effect of the logical knowledge to its recognized result. The feedback mechanism 5a is a conventional sequential type computer which is a logical type expert system. The computer may be provided with another function such as a manmachine interface. The feedback operation which depends on a matter to be concerned is executed in accordance with a professional experience and knowledge.

Application to Evaluation of Power System

Then, the case where the neural network computation apparatus is applied to the aforementioned power system state evaluation system will be described.

After the feedback mechanism 5a learns an example, it changes the selective reaction coefficient $c^{(n)}$ and the relative contribution coefficient fn in accordance with the outputs of the logic unit group 13 and the following rule.

IF (an interpolation is required),
(the evaluation output is zero).
THEN (the selective reaction coefficient $c^{(n)}$ is increased).
or
IF (it seems that a voltage abnormality occurs in a particular region),
THEN (the relative contribution coefficient fn is unbalanced and the region is considered).

Figure 6A:
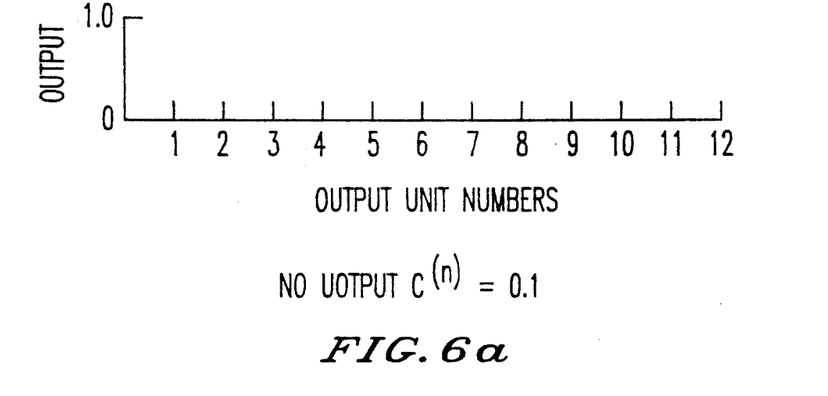
Figure 6B:
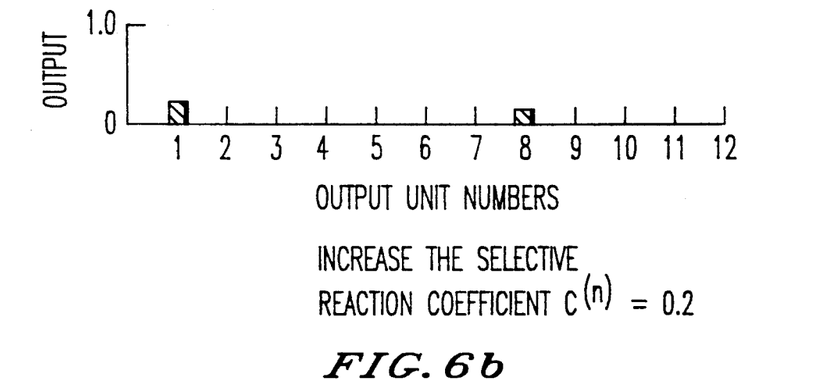
Figure 6C:
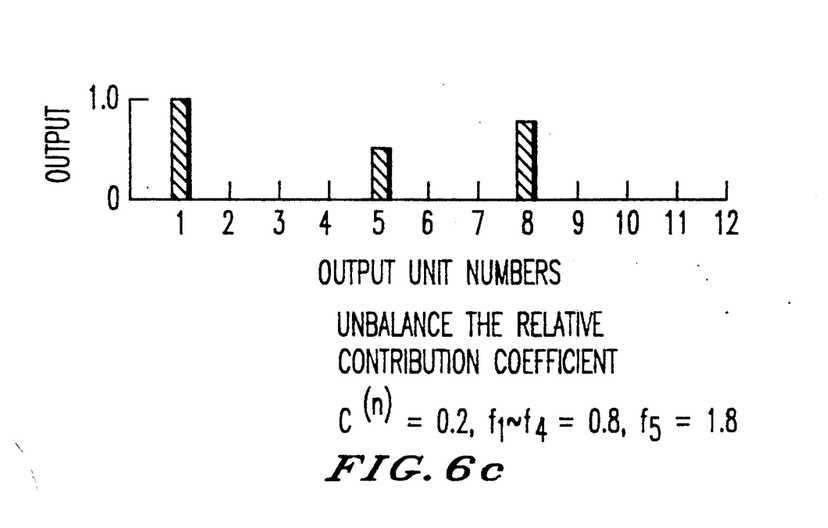

FIG. 6 shows the evaluation results of the neural network computation apparatus.

In the state shown in FIG. 6 (a), since the selective reaction coefficient $c^{(n)}$ of the characteristic layer 9 is small, the relationship between the inputs and the outputs used in the learning operation cannot be interpolated thereby the evaluation output is 0.

When an interpolation request signal is input from the logic unit group 13 to the feedback mechanism 5a, the feedback mechanism 5a increases the selective reaction coefficient $c^{(n)}$ in accordance with the aforementioned rule. Consequently, as shown in FIG. 6 (b), outputs from the logic unit group 13 take place. In other words, outputs representing particular region blocks (in this case, output number 8 equivalent to the northwest region) take place.

The feedback mechanism 5a increases the relative contribution coefficient f5 of the group 5 in accordance with the northwest region and the aforementioned rule. In contrast, the feedback mechanism 5a decreases the relative contribution coefficients f1 to f4. Thus, the contribution coefficient of the data of northwest region increases and thereby the evaluation result as shown in FIG. 6 (c) is obtained.

As described above, by the feedback to the recognized result by the logic unit, a pattern fixed by learning an example can be changed. Thus, the determination can be widely and flexibly done.

The feedback mechanism 5a according to the present embodiment executed the feedback operation in accordance with a knowledge described in the format of a rule by a conventional computer. Since it has been widely known that a knowledge in the format of a rule can be easily networked, it is possible to accomplish a part of the feedback mechanism 5a as the neural network computation apparatus.

As was described above, according to the present invention, since the changing means for dynamically changing the reaction characteristic of each unit or the strength of the link of each unit after learning an example is provided, the logical knowledge can be related to the pattern recognition characteristics.

In other words, a proper determination in accordance with an experience can be made so as to deal with unknown patterns with high flexibility.

What is claimed is:

1. A trained neural network, comprising:
processing neuron layer means connected between an input neuron layer and an output neuron layer;
connection means between neurons of different layers having predetermined weights;
means for determining if an output from said output neuron layer resulting from an input to said input neuron layer and a processing by said processing neuron layer means matches any of a plurality of possible outputs, and if said output does not match any of a plurality of possible outputs, modifying at least one of said weights of connections between said neurons and a reaction coefficient of at least one neuron such that said neural network reprocesses said input and calculates another output which matches one of said plurality of possible outputs.

2. A train neural network according to claim 1, wherein said trained neural network further comprises
a characteristic layer connected to said input neuron layer;
an associative layer connected to said characteristic layer; and
a logic unit group including said output neuron layer, said logic unit group connected to said associative layer.

3. A method of operating a trained neural network having a plurality of neural layers including a processing layer connected between an input layer and an output layer, comprising the steps:
inputting data to be processed by the trained neural network by the input layer;
processing the inputted data by the processing layer of the trained neural network;
examining a result of said processing step at the output layer and if the result does not match any of a plurality of predetermined possible outputs, using previously determined expert knowledge to modify at least one of weights of connections between neurons and a reaction coefficient of at least one neuron;
reprocessing said input data by said modified neural network and obtaining one of said predetermined possible outputs.

4. A method of operating a trained neutral network having a plurality of neural layers including a processing layer connected between an input layer and an output layer, comprising the steps:
inputting data to be processed by the trained neural network by the input layer;
processing the inputted data by the processing layer of the trained neural network;
examining a result of said processing step at the output layer and if the result requires an interpolation, using previously determined expert knowledge to modify at least one of weights of connections between neurons and a reaction coefficient of at least one neuron;
reprocessing said input data by said modified neural network in obtaining one of said predetermined possible outputs.

* * * * *

UNITED STATES PATENT AND TRADEMARK OFFICE
CERTIFICATE OF CORRECTION

PATENT NO. : 5,222,194
DATED : JUNE 22, 1993
INVENTOR(S) : KAZUO NISHIMURA

It is certified that error appears in the above-indentified patent and that said Letters Patent is hereby corrected as shown below:

Column 5, line 11, delete "is";
        line 12, change "the of" to --of the--;
        line 61, delete in its entirety and insert $$--u_k = ||W^{(n)}k - V^{(n)}|| / ||W^{(n)}{}_k|| \qquad (3)--.$$

Column 6, line 18, delete in its entirety and insert $$--A_{np} = \max(a_k) \qquad k \doteq R_{np} \qquad (4);--$$

line 45, after "defined" insert --with--.

Signed and Sealed this

Twenty-second Day of November, 1994

*Attest:*

BRUCE LEHMAN

*Attesting Officer*      *Commissioner of Patents and Trademarks*